United States Patent Office 3,576,797
Patented Apr. 27, 1971

---

3,576,797
BIOLOGICALLY ACTIVE DERIVATIVES OF 6-AMINOPENICILLANIC ACID AND THEIR PRODUCTION
Frank Peter Doyle, Betchworth, John Herbert Charles Nayler, Catford, London, and George Newbolt Rolinson, Betchworth, England, assignors to Beecham Group Limited, Brentford, England
No Drawing. Continuation of application Ser. No. 826,491, July 13, 1959, which is a division of application Ser. No. 750,075, July 22, 1958, now Patent No. 2,941,995, dated June 21, 1960. This application Dec. 12, 1968, Ser. No. 807,145
Claims priority, application Great Britain, Aug. 2, 1957, 26,607/57, Patent 870,395
Int. Cl. C07d *99/22*; A61k *21/00*
U.S. Cl. 260—239.1
6 Claims

ABSTRACT OF THE DISCLOSURE

This invention relates to N acylated derivatives of substances produced by penicillin-producing moulds.

---

This application is a continuation of application Ser. No. 826,491, filed July 13, 1959, now abandoned, which, in turn, is a division of application Ser. No. 750,075, filed July 22, 1958, now U.S. Pat. 2,941,995 granted June 21, 1960.

It is well known that substances having antibiotic activity can be obtained by growing certain moulds, for example moulds of the genus Penicillium such as *Penicillium chrysogenum* in the presence of a suitable nutrient medium. One group of these antibiotic substances are known as penicillins and have the general formula:

$$R\text{—}Pn\text{—}COOH \quad (I)$$

in which Pn is a molecular grouping $C_8H_{10}O_2N_2S$ which is now generally agreed to have the following structure:

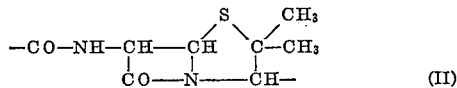
(II)

Previous work on penicillins had shown that the amount of antibiotic material obtained as a metabolite or a penicillin-producing mould was only a minor part of the total products obtained. Later it was found that the yield of penicillins could be increased very considerably by growing the mould in the presence of certain chemical compounds which became known as "precursors." These compounds appear to function by facilitating the introduction of the group R of Formula I into the penicillin molecule and all the penicillins at present produced on a commercial scale are made using a precursor in this way.

It has now been found according to this invention that substances having antibiotic activity can be obtained by reacting with a suitable chemical reagent, the fermentation liquor obtained by growing a penicillin-producing mould preferably in the absence of an added precursor.

The term "fermentation liquor" as used herein means the liquid material obtained from a fermentation.

We have found that this liquor contains a compound of the structural formula

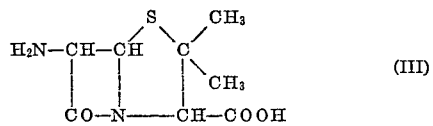
(III)

which we term 6-aminopenicillanic acid following the nomenclature adopted by other workers in analogous fields.

The present invention therefore provides 6-aminopenicillanic acid having a structural formula:

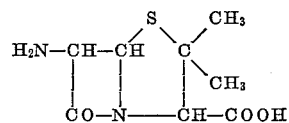

which is capable of reacting with phenylacetyl chloride to produce benzylpenicillin, and which gives a negative Bratten-Marshall test and a negative ninhydrin test, and its salts.

6-aminopenicillanic acid is a non-hydroscopic compound which in a substantially pure form had a melting point of 209 to 210° C. and analysed as follows: Found (percent): C, 44.6; H, 5.7; N, 13.1; S, 14.1. $C_8H_{12}O_3N_2S$ requires (percent): C, 44.4; H, 5.6; N, 13.0; S, 14.8.

The present invention further includes a process for the preparation of 6-aminopenicillanic acid or its salts in which a penicillin-producing mould is grown in a nutrient medium and the 6-aminopenicillanic acid or a salt thereof is isolated from the fermentation liquor obtained. This isolation may be effected by first concentrating the liquor and thereafter treating it with an ion-exchange resin, the eluate from the resin being concentrated and the 6-aminopenicillanic acid in crystalline form precipitated therefrom by the addition of an acid, e.g. hydrochloric acid. In one form of the invention the eluate from the ion-exchange resin is purified by chromatography on a cellulose column before the 6-aminopenicillanic acid is precipitated therefrom. If desired any penicillins may be removed from the fermentation liquor prior to the treatment of the liquor with the ion-exchange resin.

The ion-exchange resin employed may be a highly basic anion-exchange resin, for example, a resin of the cross-linked polystyrene type with quaternary ammonium functional groups sold under the trade names "Dowex 1" and "DeAcidite FF." Alternatively, the anion-exchange resin may be an acid cationic exchange resin, an example of which is a resin of the cross-linked polystyrene type with sulphonic acid groups sold under the trade name "Amberlite IR 120."

The present invention still further provides a process for the preparation of derivatives of penicillanic acid in which the fermentation liquor obtained by growing a penicillin-producing mould in a nutrient medium with or without subsequent partial purification, or 6-aminopenicillanic acid isolated from such liquor is reacted with a carboxylic acid chloride or bromide, a sulphonic acid chloride, an ester of chlorocarbonic acid, an acid anhydride of a carboxylic acid or a mixed acid anhydride derived from a carboxylic acid.

Suitable penicillin-producing moulds include species of Penicillium, for example *Penicillium chrysogenum* 5120C. The mould is grown preferably under aerobic submerged culture conditions.

Since some of the antibiotic substances obtained by the process of this invention are relatively unstable compounds which readily undergo chemical changes resulting in the loss of antibiotic activity, it is desirable to choose reaction conditions which are sufficiently moderate to avoid their decomposition. The reaction conditions chosen will, of course, depend largely upon the reactivity of the chemical reagent being used. In most instances, a compromise has to be made between the use of very mild conditions for a lengthy period and the use of more vigorous conditions for a shorter time with the possibility of decomposing some of the antibiotic substance.

The temperature chosen for the process of preparation of the derivatives of penicillanic acid should in general not exceed 30° C. and in many cases a suitable temperature is ambient temperature. Since the use of strongly acid or alkaline conditions in the process of this invention should be avoided, it has been found preferable to perform the process at a pH of from 6 to 9, and this can conveniently be achieved by using a buffer, for example a solution of sodium bicarbonate, or a sodium phosphate buffer.

The culture medium used to obtain the fermentation liquor used in the process of this invention can be one of the generally accepted media commonly used in the preparation of penicillins. The culture medium usually consists essentially of a carbohydrate nutrient material, for example glucose or lactose; calcium carbonate, sodium sulphate, and a nitrogenous material capable of providing the nitrogen necessary for the growth of the mould. The nitrogenous material can be either a natural substance, for example peanut meal, or it can be one or more chemical compounds containing nitrogen, for example ammonium salts such as ammonium lactate or ammonium acetate. Where one or more chemical compounds are used as the nitrogenous material it is usual to incorporate in the culture medium very small amounts of a number of metals such as calcium, iron, zinc, copper, magnesium and manganese and these are normally introduced in the form of an aqueous solution of their salts. A suitable culture medium containing ammonium salts as the nitrogenous material is described by Jarvis and Johnson, J.A.C.S., 69, 3010, (1947), and J. Bact. 59, 51, (1950). Natural nitrogenous materials such as peanut meal usually contain sufficient amounts of suitable inorganic salts and thus when such materials are used in the culture medium it is usually not necessary to make a separate addition of inorganic salts.

The fermentation conditions used in the preparation of the fermentation liquor used in this invention can vary between wide limits, but it has been found preferable to use conditions similar to those commonly used in the preparation of Penicillin G. The temperature employed is preferably one from 20° C. to 35° C. and very satisfactory results have been obtained using a temperature of 25–27° C. The time required for the fermentation depends upon the culture medium and the mould used and the temperature at which the fermentation is carried out. Normal fermentation times are from 48 to 120 hours. The progress of the fermentation can be followed by means of periodic assay.

The fermentation liquor is obtained most satisfactorily when the fermentation is carried out under highly aerobic conditions. In the small scale operations referred to in the examples of this specification, aerobic conditions were achieved by shaking the fermentation mixture on a rotary shaking machine. When working on a larger scale, aerobic conditions can conveniently be obtained either by bubbling air or oxygen through the fermentation mixture, or by rapidly stirring the fermentation mixture. If desired, a combination of stirring and the bubbling of air or oxygen can be used.

It is sometimes preferred to prepare the antibiotic substances by the use of the isolated 6-aminopenicillanic acid or one of the intermediate concentrates obtained during its isolation. A concentrated solution of 6-aminopenicillanic acid can be prepared by evaporating the clarified harvest brew at reduced temperature and pressure to a small volume. If desired, the penicillins present in the brew can be largely removed by extraction with an organic solvent such as butyl acetate at an acid pH. After neutralising the liquid substantial amounts of impurities can then be precipitated by the addition of solvents such as acetone, methanol or ethanol. After separating such impurities the clear liquor may then be further concentrated to give a concentrated preparation.

The production by the process of this invention of antibiotic material from fermentation liquor having little or no antibiotic activity is clearly indicated if, before the addition of one of the chemical reagents hereinbefore specified to the fermentation liquor, the penicillins already present as a result of the fermentation reaction by which the fermentation liquor was obtained are removed. This removal can readily be achieved as indicated above by extracting the penicillins from the acidified fermentation liquor by means of an organic solvent, for example, butyl acetate, in which the penicillins are soluble. It will be seen from the examples below that in some instances a very considerable increase in antibiotic activity was obtained as a result of the chemical modification of the fermentation liquor according to the process of this invention. Where phenylacetyl chloride was used as the chemical reagent, for example, the antibiotic activity obtained after the reaction was 23 times as great as that before the reaction.

The following examples illustrate the invention:

EXAMPLE 1

This example describes the preparation and isolation of 6-aminopenicillanic acid.

(a) A strain of *Penicillium chrysogenum* 5120C (obtained from Professor E. B. Chain, Istituto Superiore di Sanita, Rome) was first grown on a glycerol-molasses agar slope for 7 days at 26° C. Sterile distilled water was then added and the spores washed off the surface of the culture to produce a spore suspension. About 10 mils. of this suspension were used to inoculate 5 litres of seed medium in a 10-litre stainless steel stirred fermenter. The seed medium contained 8% w./v. corn steep liquor, 6% w./v. of dextrin and tap water, the pH being adjusted to 6.1 before sterilising the fermenter and its contents. The tank was stirred at 500 r.p.m. with an air flow of 1 vol./vol./min. and maintained at 27° C. for 48 hours. A volume of 3.2 litres of the contents of this fermenter was then transferred aseptically into a 90-litre stainless steel fermenter containing 50 litres of fermentation medium consisting of peanut meal 3.0% w./v., lactose 4.0% w./v., $Na_2SO_4$ 0.1% w./v., $CaCO_3$ 1.0% w./v. and tap water. The pH was adjusted to 7.2 before the fermenter and its contents were sterilised. After inoculation the tank was maintained at 26–28° C. for 4 days and stirred at 600 r.p.m. by means of an impeller of 12.5 cms. diameter. Air bubbled through the tank at the rate of 1 vol./vol./min. Foaming was controlled by the periodic addition of lard oil containing 2% of octadecanol.

The brew obtained was clarified and 40 litres thereof was concentrated in vacuo to a volume of 4 litres. The pH was then adjusted to 3.0 and the precipitate which formed was removed by centrifuging and the clear liquor was extracted once with half its volume of butyl acetate. The aqueous phase was separated and the pH adjusted to 7.5. 3 vols. of acetone was then added with stirring and the precipitate removed by centrifuging. The clear liquor was then concentrated to 2280 mls. and the pH adjusted to 7.0. It had a potency of 54 $\mu$/mgm. assayed as described below.

The 6-aminopenicillanic acid was assayed by reacting a sample with phenylacetyl chloride and assaying the penicillin found by the cup plate method described by N. G. Heatley in Biochem. J., 38, 61 (1944) using *B. subtilis* as the bacterium. The purity of the preparation can then be expressed in units per mgm. ($\mu$/mgm.) of dry substance.

The potency of pure 6-aminopenicillanic acid assayed by this method is 2750 $\mu$/mgm.

(b) 1200 mls. of the concentrate of potency 54 $\mu$/mgm. were percolated through 200 gms. of Dowex I resin conditioned with hydrochloric acid. The column was washed with water and this wash was combined with the percolate. The assay of this solution proved it to contain 15% of the 6-aminopenicillanic acid applied. The column was then eluted with 0.05 N hydrochloric acid. The pooled active fractions of the eluate contained 81% of the original 6-aminopenicillanic acid, the solution assaying at 900 $\mu$/mgm. The eluate was then adjusted to pH 6.0 and concentrated to 25 mls. in vacuo, concentrated hydrochloric acid was added with stirring to bring the pH to 4.3 and the crystalline 6-aminopenicillanic acid then filtered off and washed with water followed by acetone, and then dried in vacuo. The yield was 1.0 gm. assaying at 2200 µ/mgm. (80% pure). Repeated precipitation of the crystalline material from neutral aqueous solution by the addition of hydrochloric acid gave a white crystalline solid of melting point 209–210° C. assaying at 2740 µ/mgm. analysing as follows: (Found (percent): C, 44.6; H, 5.7; N, 13.1; S, 14.1. $C_8H_{12}O_3N_2S$ requires (percent): C, 44.4; H, 5.6; N, 13.0; S, 14.8).

EXAMPLE 2

Example 1(a) was repeated and 8 litres of the concentrate was percolated through a column of 700 gms. of DeAcidite FF resin conditioned with acetic acid. The column was 5 cms. x 87.5 cms. The column was washed with water and the percolate and washings combined. The column was eluted with N acetic acid and the eluate collected in fractions. The active fractions were pooled to give 2710 mls. of solution assaying at 388 µ/mgm. This 2710 mls. of solution was evaporated in vacuo to dryness and washed with 50 mls. of water. This evaporation to dryness and washing with water was repeated twice and after finally dissolving in 50 mls. of water the pH was adjusted to 7.0 with 4 N ammonia to give a volume of 85 mls. To this solution was added 85 mls. of acetone, 85 mls. of isopropanol and 25 mls. of water and then chromatographed on a column of cellulose 10 cms. x 40 cms. containing 1.5 kgms. of cellulose and developed with a mixture of water, acetone and isopropanol (1:1:1). The eluate was collected in fractions and the active fractions pooled and evaporated in vacuo to 15 mls. Concentrated hydrochloric acid was added with stirring to bring the pH to 5.0 and the crystalline 6-aminopenicillanic acid was filtered off. The crystals were washed once with water and twice with acetone and dried in vacuo. The yield was 1.9 gms. assayed at 2060 µ/mgm. (75% pure). The product was purified by recrystallisation as in Example 1, yielding a pure 6-aminopenicillanic acid having the same properties as the final product of Example 1.

The following Examples 3 to 32 illustrate the preparation of antibiotic substances from 6-aminopenicillanic acid.

The procedure to be followed in preparing antibiotic substances from 6-aminopenicillanic acid depends largely upon the extent to which the starting material has itself been purified. Thus 6-aminopenicillanic acid may be used in three different stages of purification, as indicated below:

(a) From isolated 6-aminopenicillanic acid

When 6-aminopenicillanic acid is available in relatively pure form it is only necessary to use a small excess (ca. 20%) of reagent and the product is, in turn, obtained fairly pure (as indicated by manometric assay using penicillinase).

The reagents used in this way include fifteen different monocarboxylic acid chlorides and also adipyl chloride, propionic anhydride, carbobenzoxyglycine ethoxy-formic anhydride, benzyl chloroformate, and p-toluenesulphonyl chloride.

(b) From 6-aminopenicillanic acid concentrates

The starting material was a clarified fermentation liquor which had been subjected to an initial concentration procedure and from which the natural penicillins had been substantially removed by solvent extraction at pH 2 to 3. The neutralised aqueous solution usually contained 0.6–1.2 mg./ml. of 6-aminopenicillanic acid, which represented about 1% of the total solids present.

With such material it was necessary to use a much larger excess of reagent (10 to 50 times the theoretical amount) because various impurities (e.g. amino-acids and simple peptides) would also be susceptible to acylation and similar reactions. The products were worked up in essentially the same way as in (a), but the resulting sodium salts were, of course, very much less pure.

The reagents used in this way include phenoxy-acetyl chloride, phenylacetyl chloride, α-chlorophenylacetyl chloride, chloroacetyl chloride, diphenylacetyl chloride, and adipyl chloride (all of which had also been reacted by Method (a)) and also α-naphthylacetyl chloride, β-naphthoxyacetyl chloride and p-nitrophenoxyacetyl chloride.

(c) From dilute brew

The initial material was the original clarified fermentation brew from which natural penicillins had been substantially removed by solvent extraction at pH 2 to 3, but which had not been concentrated. It was thus about ten times more dilute than the solutions used in Method (b). Use of a large excess of reagent was again essential. With this very dilute material no attempt was made to isolate the reaction products, but the formation of antibiotic material was demonstrated by the increased antibacterial activity of the solution after reaction by paper chromatography, a new zone of biologically active material being detected in every case.

The reagents used successfully in this way include phenoxyacetyl chloride, phenylacetyl chloride, α-naphthylacetyl chloride, α-naphthoxyacetyl chloride, β-naphthoxyacetyl chloride, p-nitrophenoxyacetyl chloride, α-chlorophenylacetyl chloride, diphenylacetyl chloride, crotonyl chloride, chloroacetyl chloride, phthalimidoacetyl chloride, benzoyl chloride, hexahydrobenzoyl chloride, m-sulphobenzoyl chloride, adipyl chloride, propionic anhydride, and n-butyric anhydride.

EXAMPLE 3

A strain of Penicillium chrysogenum (5120C obtained from Professor E. B. Chain, Istituto Superiore di Sanita, Rome) was grown on a glycerol-molasses agar slope for 7 days at 26° C. The spores obtained were removed by washing with sterile distilled water and the suspension of spores obtained was used to inoculate 100 ml. of a culture medium contained in a 500 ml. conical flask. The flask and its contents had previously been sterilised with steam under pressure in an autoclave. The culture medium used was one having the following composition:

| | Parts by weight |
|---|---|
| Water | 100 |
| Corn steep liquor | 8 |
| "Liquid glucose" | 6 | and the pH of the medium had been adjusted to a value of 5.2–5.3 by the addition of a solution of sodium hydroxide. The "liquid glucose" used was a mixture of carbohydrates consisting essentially of maltose, glucose and low molecular weight dextrins. The inoculated flask was shaken for 48 hours at a constant temperature of 26° C. on a rotary shaking machine having a throw of 3.4 cms. and operating at 250 r.p.m. At the end of this period of 48 hours a substantial growth of mycelium had been obtained in the flask. The resulting culture was then used to inoculate a synthetic fermentation medium without the addition of an added precursor. The fermentation medium used had the following composition:

| | Parts by weight |
|---|---|
| Water | 100.0 |
| Lactose | 4.0 |
| Glucose | 2.0 |
| Ammonium lactate | 0.5 |
| Ammonium acetate | 0.3 |
| $KH_2PO_4$ | 0.3 |
| $Na_2SO_4$ | 0.05 |
| $FeSO_4 \cdot 7H_2O$ | 0.01 |
| $MgSO_4 \cdot 7H_2O$ | 0.025 |
| $ZnSO_4 \cdot 7H_2O$ | 0.002 |
| $MnSO_4$ | 0.002 |
| $CaCl_2 \cdot 2H_2O$ | 0.005 |
| $CuSO_4 \cdot 5H_2O$ | 0.0005 |
| $CaCO_3$ | 1.0 |

The pH of the fermentation medium was about 6. The fermentation was carried out in a flask on a shaking machine at 26° C.

At the end of the 96 hours fermentation period, the mycelium obtained was filtered from the fermentation broth and the fermentation liquor obtained as the filtrate was acidified to pH 3 with phosphoric acid and extracted once with half its volume of butyl acetate at 5° C. which removed most of the penicillins which it contained.

The extracted fermentation liquor was neutralized with sodium hydroxide solution and assayed by means of the cup plate method described by N. G. Heatley in Biochem. J., 38, 61 (1944), using *B. subtilis* as the bacterium.

A 50 ml. portion of the extracted fermentation liquor was brought to pH 8 by the addition of solid sodium bicarbonate and stirred at 0° C. while a solution of 0.5 gm. of phenoxyacetyl chloride in acetone was added in the course of a few minutes. The mixture was stirred at 0° C. for one hour, filtered, and excess reagent was removed by extraction with three portions of ether. The ether extracts were themselves washed with water and the washings added to the main aqueous solution which was then readjusted to pH 6 to 7 by the addition of hydrochloric acid.

Assay of the aqueous solution obtained (which had a volume of 65 ml.) using the method referred to above, showed that it contained a material having considerable antibiotic activity which was about 11 times greater for the whole volume of liquid than that of the initial solution. The results obtained from the assay were as follows:

| | Activity (I.U.) |
|---|---|
| Extracted fermentation liquor (volume 50 ml.) | 650 |
| Reaction product (volume 65 ml.) | 7,150 |

By means of paper chromatography it was shown that the antibiotic material contained in the aqueous solution had an Rf value of the same order as penicillin V and the stability of the aqueous solution at pH 2 also indicated a resemblance to that of penicillin V.

EXAMPLE 4

Example 3 was repeated using phenylacetyl chloride in place of phenoxyacetyl chloride.

Both the extracted fermentation liquor and the aqueous solution of the reaction product were assayed by the method described in Example 3 with the following results:

| | Activity (I.U.) |
|---|---|
| Extracted fermentation liquor (volume 50 ml.) | 350 |
| Reaction product (volume 65 ml.) | 8,125 |

It will be seen that the activity was as much as 23 times greater after the reaction with phenylacetyl chloride than before.

By means of paper chromatography it was shown that the antibiotic material contained in the aqueous solution had an Rf value of the same order as penicillin G and the stability of the aqueous solution at pH 2 also indicated a resemblance to that of penicillin G.

EXAMPLE 5

Example 3 was repeated using benzoyl chloride in place of phenoxyacetyl chloride. Both the extracted fermentation liquor and the aqueous solution of the reaction product were assayed by the method described in Example 3, with the following results:

| | Activity (I.U.) |
|---|---|
| Extracted fermentation liquor (volume 50 ml.) | 350 |
| Reaction product (volume 70 ml.) | 875 |

It will be seen that the activity was 2.5 times greater after the reaction with benzoyl chloride than before.

EXAMPLE 6

Example 4 was repeated using a fermentation medium based upon peanut meal instead of upon the synthetic material. The fermentation medium used had the following composition:

| | Parts by weight |
|---|---|
| Water | 100.0 |
| Lactose | 4.0 |
| Peanut meal | 3.0 |
| $Na_2SO_4$ | 0.1 |
| $CaCO_3$ | 1.0 |

Both the extracted fermentation liquor and the aqueous solution of the reaction product were assayed by the method described in Example 3 with the following results:

| | Activity (I.U.) |
|---|---|
| Extracted fermentation liquor (volume 50 ml.) | 700 |
| Reaction product (volume 56 ml.) | 7,840 |

It will be seen that the activity was 11 times greater after the reaction with phenylacetyl chloride than before.

EXAMPLE 7

Example 6 was repeated using α-naphthylacetyl chloride in place of phenylacetyl chloride.

Both the extracted fermentation liquor and the aqueous solution of the reaction product were assayed by the method described in Example 3 with the following results:

| | Activity (I.U.) |
|---|---|
| Extracted fermentation liquor (volume 50 ml.) | 700 |
| Reaction product (volume 56 ml.) | 4,032 |

The results show that the activity was more than 5 times as great after the reaction with α-naphthylacetyl chloride as before the reaction.

EXAMPLE 8

Example 6 was repeated using β-naphthoxyacetyl chloride in place of phenylacetyl chloride.

The results of assay by the method of Example 3 show that the activity after the reaction with the β-naphthoxyacetyl chloride was more than 5 times greater than before reaction.

| | Activity (I.U.) |
|---|---|
| Extracted fermentation liquor (volume 50 ml.) | 700 |
| Reaction product (volume 66 ml.) | 4,092 |

EXAMPLE 9

Example 6 was repeated using α-chlorophenylacetyl chloride in place of phenylacetyl chloride.

Both the extracted fermentation liquor and the aqueous solution of the reaction product were assayed by the method described in Example 3 with the following results:

| | Activity (I.U.) |
|---|---|
| Extracted fermentation liquor (volume 50 ml.) | 700 |
| Reaction product (volume 62 ml.) | 5,332 |

The results show that the activity was more than 7 times as great after reaction with the α-chlorophenylacetyl chloride as before the reaction.

EXAMPLE 10

This example describes the preparation of phenoxymethylpenicillin (Penicillin V) and is typical of the reaction of isolated 6-aminopenicillanic acid and monocarboxylic acid chlorides.

A solution of phenoxyacetyl chloride (360 mgm.) in dry acetone (5 ml.) was added dropwise during 10 minutes to a stirred solution of 6-aminopenicillanic acid (450 mgm., approx. 75% pure) in 3% aqueous sodium bicarbonate (18 ml.) and acetone (12 ml.). When addition was complete the mixture was stirred at room temperature for 30 minutes and then extracted with ether (30 ml. in 3 portions), only the aqueous phase being retained. This aqueous solution was covered with butanol (5 ml.) and adjusted to pH 2 by the addition of N hydrochloric acid. After separating the layers, the aqueous phase was extracted with two 2.5 ml. portions of butanol, adjusting to pH 2 each time. The combined butanol solutions (which at this stage contained the free penicillin acid) were washed with water (3 × 2 ml.) and then shaken with water (10 ml.) to which sufficient 3% sodium bicarbonate solution was added to bring the aqueous phase to pH 7. The butanol solution was further extracted with two 5 ml. portions of water to each of which was added enough bicarbonate solution to produce an aqueous phase of pH 7. The combined aqueous solutions were washed with ether (20 ml.) and then evaporated at low temperature and pressure to leave the crude sodium salt of phenoxymethyl penicillin which, after drying in a vacuum desiccator, was obtained as a slightly hygroscopic powder (591 mgm.).

The purity of the product was estimated by the penicillinase assay as 73% and, by biossay, as 68%. In its chromatographic behavior and its antibacterial spectrum, the product showed no significant difference from authentic phenoxymethyl penicillin. It also exhibited the relative stability towards acids which is characteristic of this particular penicillin. No loss of activity could be detected after 2 hours at pH 2.

EXAMPLE 11

This example describes the preparation of δ-carboxybutyl penicillin and is typical of the reaction of isolated 6-aminopenicillanic acid with a dicarboxylic acid chloride. The proportion of reagents and the mode of addition were designed to favor formation of a mono- rather than a bis-derivative of adipic acid.

Two separate solutions, one containing 6-aminopenicillanic acid (500 mgm.) in 3% aqueous sodium bicarbonate solution (6.4 ml.) and the other adipyl chloride (420 mgm.) in dry acetone (6 ml.) were added at equal rates over a period of 10 minutes to a stirred mixture of 3% sodium bicarbonate solution (25 ml.) and acetone (25 ml.). The mixture was stirred at room temperature for 30 minutes, then extracted with ether (60 ml. in 3 portions) and the extracts discarded. The product was isolated by extracting the free penicillin acid into butanol and then re-extracting into water at pH 7 as described in Example 10. The yield of dry sodium salt of δ-carboxybutyl penicillin was 445 mgm., which was estimated by the manometric penicillinase assay to be 52% pure. When subjected to paper chromatography the product gave only a single zone of antibiotic acitvity. The percentage remaining after 2 hours at pH 2 was less than 25%.

EXAMPLE 12

This example describes the preparation of ethyl penicillin and is typical of the reaction of isolated 6-aminopenicillanic acid with a simple carboxylic acid anhydride.

6-amnopenicillanic acid (400 mgm.) was acylated as described in Example 10 except that the reagent used was propionic anhydride (140 mgm.). After working up as in Example 10 the yield of crude sodium salt of ethyl penicillin was 260 mgm., which was estimated by manometric penicillinase assay to be 53% pure. The percentage remaining after 2 hours at pH 2 was less than 3%.

EXAMPLE 13

This example describes the preparation of carbobenzoxyaminomethyl penicillin and is typical of the reaction of isolated 6-aminopenicillanic acid with an unstable mixed anhydride.

A solution of N-carbobenzoxy glycine (450 mgm.) and triethylamine (0.3 ml.) in dry acetone (10 ml.) was stirred and cooled to −5° C. A solution of ethyl chlorocarbonate (0.2 ml.) in dry acetone (2 ml.) was added dropwise with continued cooling and stirring and after 10 minutes the resulting mixture (containing N-carbobenzoxy glycine ethoxyformic anhydride and suspended triethylamine hydrochloride) was cooled to −50° C. and added slowly to a stirred ice-cold mixture prepared from 6-aminopenicillanic acid (430 mgm.), 3% sodium bicarbonate solution (17 ml.) and acetone (5 ml.). The mixture was allowed to attain room temperature and kept thus for 30 minutes with continued stirring. The product was then isolated as described in Example 10, to give the crude sodium salt of carbobenzoxyaminomethyl penicillin (469 mgm.) (purity 63%). The percentage remaining after 2 hours at pH 2 was 94%.

EXAMPLE 14

This example describes the preparation of benzyloxy penicillin and is typical of the reaction of isolated 6-aminopenicillanic acid with an ester of chloroformic (chlorocarbonic) acid.

6-aminopenicillanic acid (500 mgm.) was treated as described in Example 10 except that the reagent was benzyl chloroformate (430 mgm.) and the mixture was stirred for 100 minutes at room temperature before being worked up in the usual way. The yield of the very hygroscopic crude sodium salt of benzyloxylpenicillin was 445 mgm. (purity 90%). The percentage remaining after 2 hours at pH 2 was 71%.

EXAMPLE 15

This examples describes the preparation of 6-p-toluenesulphonamidopenicillanic acid and is typical of the reaction of isolated 6-aminopenicillanic acid with a sulphonic acid chloride.

6-aminopenicillanic acid (400 mgm.) was treated as described in Example 10 except that the reagent was p-toluenesulphonyl chloride (350 mgm.). The yield of crude sodium 6-p-toluenesulphonamidopenicillanate was 402 mgm. (purity 57%). The percentage remaining after 2 hours at pH 2 was 77%.

EXAMPLE 16

This example describes the preparation of α-naphthyl methyl penicillin and is typical of the acylation of a concentrated 6-aminopenicillanic acid brew.

α-Naphthylacetyl chloride (13 gm.) dissolved in acetone (90 ml.) was added over several minutes to a stirred mixture of the concentrate (400 ml., containing about 400 mgm. of 6-aminopenicillanic acid) and sodium bicarbonate (10 gm.). The mixture was stirred for 30 minutes at room temperature and then extracted with ether, the extracts being discarded. The aqueous phase was cooled to 0° C., covered with n-butanol (80 ml.) (or butyl acetate could be used) and brought to pH 2 by adding hydrochloric acid with stirring. The layers were separated and the aqueous phase was further extracted with butanol (2× 40 ml.). The combined butanol extracts were then shaken with water (80 ml.) and sufficient 3% aqueous sodium bicarbonate so that, after shaking, the aqueous phase was at pH 7. The layers were separated and the solvent phase was extracted twice more with water (50 ml.) and sufficient 3% sodium bicarbonate to bring the aqueous phase to pH 7. The combined aqueous solutions were washed with ether (100 ml.) and then evaporated at low temperature and pressure. Final drying in a vacuum desiccator left the very crude sodium salt of α-naphthylmethyl penicillin as a very deliquescent yellow solid (4.8 gm.). It was estimated by manometric penicillinase assay to be 9% pure. The percentage remaining after 2 hours at pH 2 was 31%.

EXAMPLE 17

The sodium salt of methylpenicillin was obtained by repeating the process of Example 10 but using acetyl chloride instead of phenoxyacetyl chloride. The yield of crude sodium salt (purity 32%) was 27 mgm. per 100 mgm. of 6-aminopenicillanic acid.

EXAMPLE 18

The sodium salt of 1-propenylpenicillin was obtained by repeating the process of Example 10 but using crotonyl chloride instead of phenoxyacetyl chloride. The yield of crude sodium salt (purity 29%) was 77 mgm. per 100 mgm. of 6-aminopenicillanic acid. The percentage remaining after 2 hours at pH 2 was 24%.

EXAMPLE 19

The sodium salt of chloromethylpencillin was obtained by repeating the process of Example 10 but using chloroacetyl chloride instead of phenoxyacetyl chloride. The yield of crude sodium salt (purity 77%) was 79 mgm. per 100 mgm. of 6-aminopenicillanic acid. The percentage remaining after 2 hours at pH 2 was 80%.

EXAMPLE 20

The sodium salt of chloromethylpenicillin was obtained by repeating the process of Example 10 but using dichloracetyl chloride instead of phenoxyacetyl chloride. The yield of crude sodium salt (purity 31%) was 80 mgm. per 100 mgm. of 6-aminopenicillanic acid. The percentage remaining after 2 hours at pH 2 was 100%.

EXAMPLE 21

The sodium salt of bromomethylpenicillin was obtained by the process of Example 10 but using bromoacetyl chloride instead of phenoxyacetyl chloride. The yield of crude sodium salt (purity 69%) was 107 mgm. per 100 mgm. of 6-aminopenicillanic acid. The percentage remaining after 2 hours at pH 2 was 95%.

EXAMPLE 22

The sodium salt of cyclohexylpenicillin was obtained by the process of Example 10 but using hexahydrobenzoyl chloride instead of phenoxyacetyl chloride. The yield of crude sodium salt (purity 70%) was 76 mgm. per 100 mgm. of 6-aminopenicillanic acid.

EXAMPLE 23

The sodium salt of phenylpenicillin was obtained by the process of Example 10 but using benzoyl chloride instead of phenoxyacetyl chloride. The yield of crude sodium salt (purity 69%) was 109 mgm. per 100 mgm. of 6-aminopenicillanic acid. The percentage remaining after 2 hours at pH 2 was less than 15%.

EXAMPLE 24

The sodium salt of benzylpenicillin was obtained by the process of Example 10 but using phenylacetyl chloride instead of phenoxyacetyl chloride. The yield of crude sodium salt (purity 70%) was 81 mgm. per 100 mgm. of 6-aminopenicillanic acid. The percentage remaining after 2 hours at pH 2 was less than 5%.

EXAMPLE 25

The sodium salt of benzhydrylpenicillin was obtained by the process of Example 10 but using diphenylacetyl chloride instead of phenoxyacetyl chloride. The yield of crude sodium salt (purity 68%) was 111 mgm. per 100 mgm. of 6-aminopenicillanic acid. The percentage remaining after 2 hours at pH 2 was 65%.

EXAMPLE 26

The sodium salt of styryl penicillin was obtained by the process of Example 10 using cinnamoyl chloride instead of phenoxyacetyl chloride. The yield of crude sodium salt (purity 24%) was 106 mgm. per 100 mgm. of 6-ominopenicillanic acid. The percentage remaining after 2 hours at pH 2 was less than 4%.

EXAMPLE 27

The sodium salt of α-chlorobenzylpenicillin was obtained by the process of Example 10 using α-chlorophenylacetyl chloride instead of phenoxyacetyl chloride. The yield of crude sodium salt was 121 mgm. per 100 mgm. of 6-aminopenicillanic acid. The percentage remaining after 2 hours at pH 2 was 98%.

EXAMPLE 28

The sodium salt of phenylthiomethylpenicillin was obtained by the process of Example 10 using phenylthioacetyl chloride instead of phenoxyacetyl chloride. The yield of crude sodium salt (purity 72%) was 150 mgm. per 100 mgm. of 6-aminopenicillanic acid. The percentage remaining after 2 hours at pH 2 was 82%.

EXAMPLE 29

The sodium salt of m-sulphophenylpenicillin was obtained by the process of Example 10 using m-sulphobenzoyl chloride instead of phenoxyacetyl chloride. The yield of crude sodium salt (purity 42%) was 62 mgm. per 100 mgm. of 6-aminopenicillanic acid. The percentage remaining after 2 hours at pH 2 was 39%.

EXAMPLE 30

The sodium salt of α-furylpenicillin was obtained by the process of Example 10 using α-furoyl chloride instead of phenoxyacetyl chloride. The yield of crude sodium salt (purity 51%) was 101 mgm. per 100 mgm. of 6-aminopenicillanic acid. The percentage remaining after 2 hours at pH was 34%.

EXAMPLE 31

The sodium salt of β-naphthoxymethylpenicillin was obtained by the process of Example 16 using α-naphthoxyacetyl chloride instead of α-naphthylacetyl chloride. The yield of crude sodium salt (purity 7%) was 1.9 gm. per 100 ml. of concentrated brew. The percentage remaining after 2 hours at pH 2 was 94%.

EXAMPLE 32

The sodium salt of p-nitrophenoxymethylpencillin was obtained by the process of Example 16 using p-nitrophenoxyacetyl chloride instead of α-naphthylacetyl chloride. The yield of crude sodium salt (purity 6%) was 1.5 gm. per 100 ml. of concentrated brew. The percentage remaining after 2 hours at pH 2 was 78%.

The free penicillins can be obtained from the sodium salts in each case by acidification.

In the foregoing examples the sodium salt has been prepared, but it is to be understood that, if desired, other salts, e.g., potassium and calcium salts, may be obtained by similar means.

The growth-inhibiting properties of some of the products of the examples are shown in the following table.

| Example | Limiting dilutions for inhibition of bacterial growth [1] (1 in:—) | | | | |
|---|---|---|---|---|---|
| | E. coli | P. vulgaris | S. typhi | Staph. aureus | B. subt. |
| 10 | 8,000 | 20,000 | 16,000 | 80 M | 20 M |
| 11 | 4,000 | 8,000 | 160,000 | 800,000 | 800,000 |
| 12 | 40,000 | 20,000 | 80,000 | 4 M | 2 M |
| 13 | 4,000 | 8,000 | 16,000 | 8 M | 4 M |
| 14 | 8,000 | 16,000 | 20,000 | 20 M | 400,000 |
| 15 | 4,000 | 8,000 | 4,000 | 800,000 | 400,000 |
| 16 | 2,000 | 2,000 | 2,000 | 40 M | 40 M |
| 17 | 20,000 | 8,000 | 40,000 | 2 M | 800,000 |
| 18 | 16,000 | 8,000 | 40,000 | 2 M | 1,600,000 |
| 19 | 20,000 | 4,000 | 80,000 | 4 M | 800,000 |
| 20 | 16,000 | 4,000 | 80,000 | 8 M | 1,600,000 |
| 21 | 1,600 | 1,600 | 40,000 | 2 M | 1,600,000 |
| 22 | <4,000 | 4,000 | 20,000 | 16 M | 2 M |
| 23 | <4,000 | 20,000 | 4,000 | 8 M | 800,000 |
| 24 | 200,000 | 200,000 | 400,000 | 40 M | 40 M |
| 25 | 8,000 | 4,000 | 8,000 | 40 M | |
| 26 | <4,000 | <4,000 | <4,000 | 1,600,000 | 800,000 |
| 27 | 16,000 | 8,000 | 80,000 | 40 M | 8 M |
| 28 | 16,000 | 20,000 | 160,000 | 160 M | 20,000 |
| 29 | <8,000 | <8,000 | 8,000 | 320,000 | 32,000 |
| 30 | 4,000 | 20,000 | 8,000 | 1,600,000 | 40,000 |
| 31 | 200 | 2,000 | 200 | 10 M | 2 M |
| 32 | 2,000 | 2,000 | 2,000 | 4 M | 4 M |

[1] Not corrected for purity.

The penicillins described in Examples 7, 8, 9, 11 to 22, 25, 27, 29, and 30 are new substances.

What is claimed is:

1. A process for the preparation of a biologically active derivative of dextrorotatory 6 - aminopenicillanic acid which comprises reacting said 6 - aminopenicillanic acid or a salt thereof at a temperature not exceeding 30° C. and at a pH of from 6 to 9 with a reagent with is a monocyclic aryl sulphonic acid chloride, an acid anhydride of a carboxylic acid or a mixed acid anhydride of a carboxylic acid.

2. A process for the preparation of biologically active derivatives of penicillanic acid which comprises preparing a liquid containing a member selected from the group consisting of 6 - aminopenicillanic acid and salts thereof and mixing therewith a reagent comprising a mixed anhydride of a carboxylic acid with a lower alkyl mono-ester of carbonic acid to form the reaction product of 6-aminopenicillanic acid and said reagent.

3. A process for the preparation of biologically active derivatives of penicillanic acid which comprises preparing a liquid containing a member selected from the group consisting of 6 - aminopenicillanic acid and salts thereof and mixing therewith a reagent comprising a monocyclic arylsulfonic acid chloride to form the reaction product of 6-aminopenicillanic acid and said reagent.

4. Carbobenzoxyaminomethylpenicillin.

5. α-Furylpenicillin.

6. A method of making acylaminopenicillanic acids of the formula.

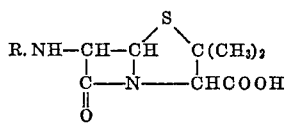

wherein R is an organic sulfonic acid radical which comprises subjecting aminopenicillanic acid of the formula:

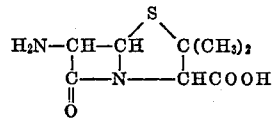

to the action of an organic sulfonic acid acylating agent.

References Cited

UNITED STATES PATENTS 3,159,617   12/1964   Sheehan.
3,470,151   9/1969   Doyle et al. _____ 260—239.1

OTHER REFERENCES

Merck Index, 6th edition, 1960, page 247 relied on.

DONALD G. DAVIS, Primary Examiner

U.S. Cl. X.R.

260—463, 543, 544, 546, 999